F. P. RYDER.
CAP SORTING AND PLACING MACHINE.
APPLICATION FILED JAN. 19, 1910. RENEWED DEC. 10, 1912.
1,050,565.
Patented Jan. 14, 1913.
13 SHEETS—SHEET 1.
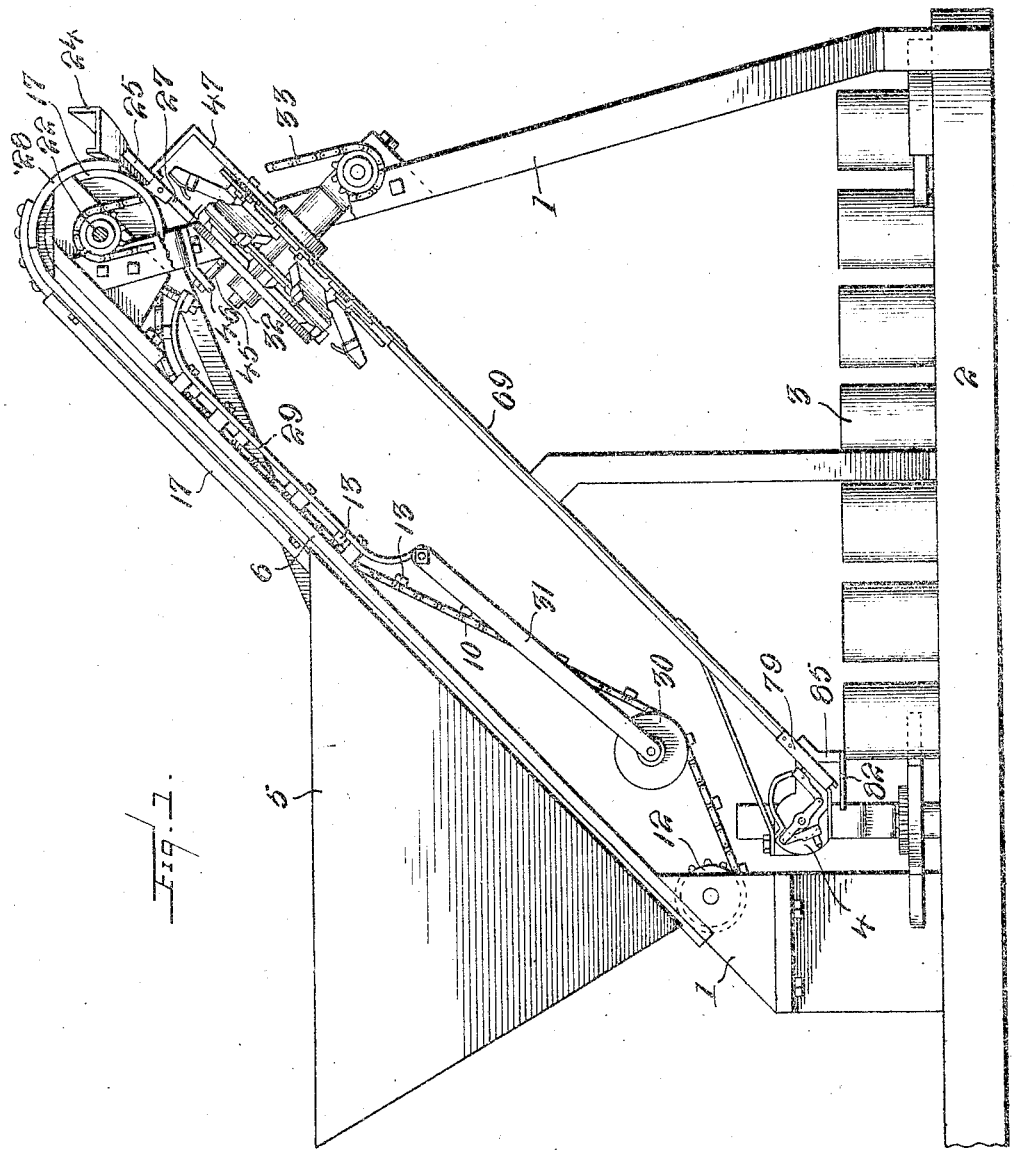
Fig. 7.
WITNESSES:
INVENTOR
Frank Pettis Ryder
BY
Attorney

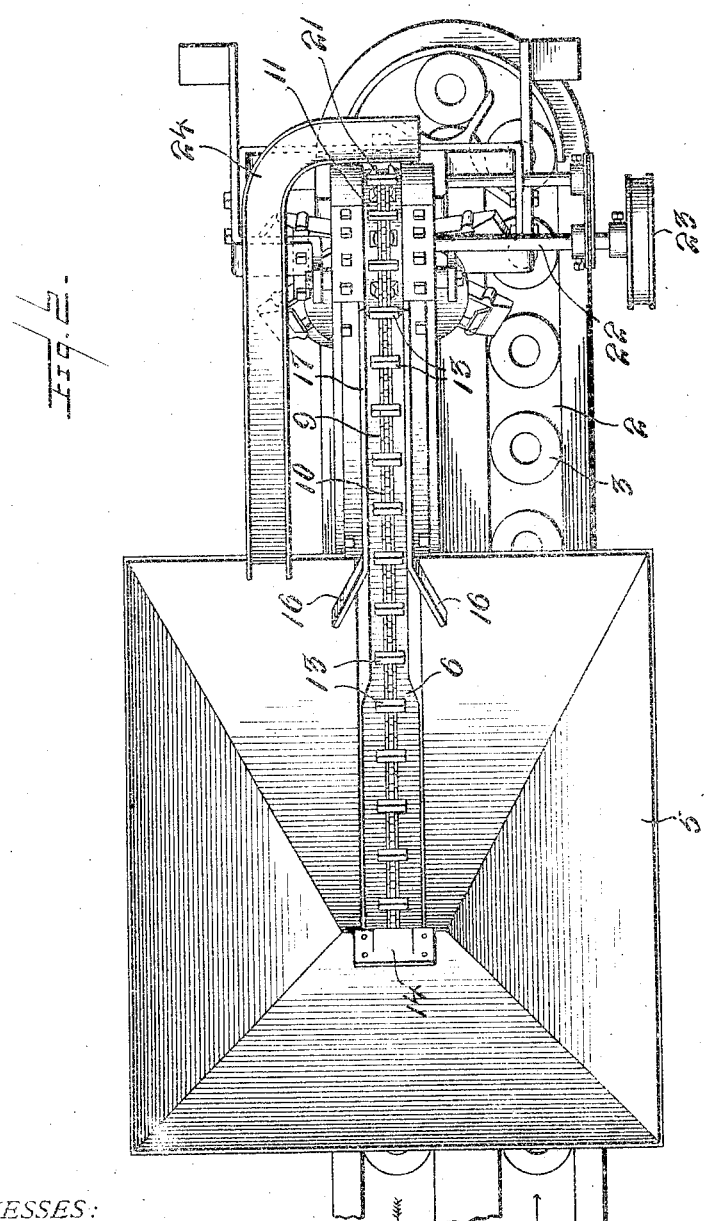

F. P. RYDER.
CAP SORTING AND PLACING MACHINE.
APPLICATION FILED JAN. 19, 1910. RENEWED DEC. 10, 1912.
1,050,565.
Patented Jan. 14, 1913.
13 SHEETS—SHEET 3.
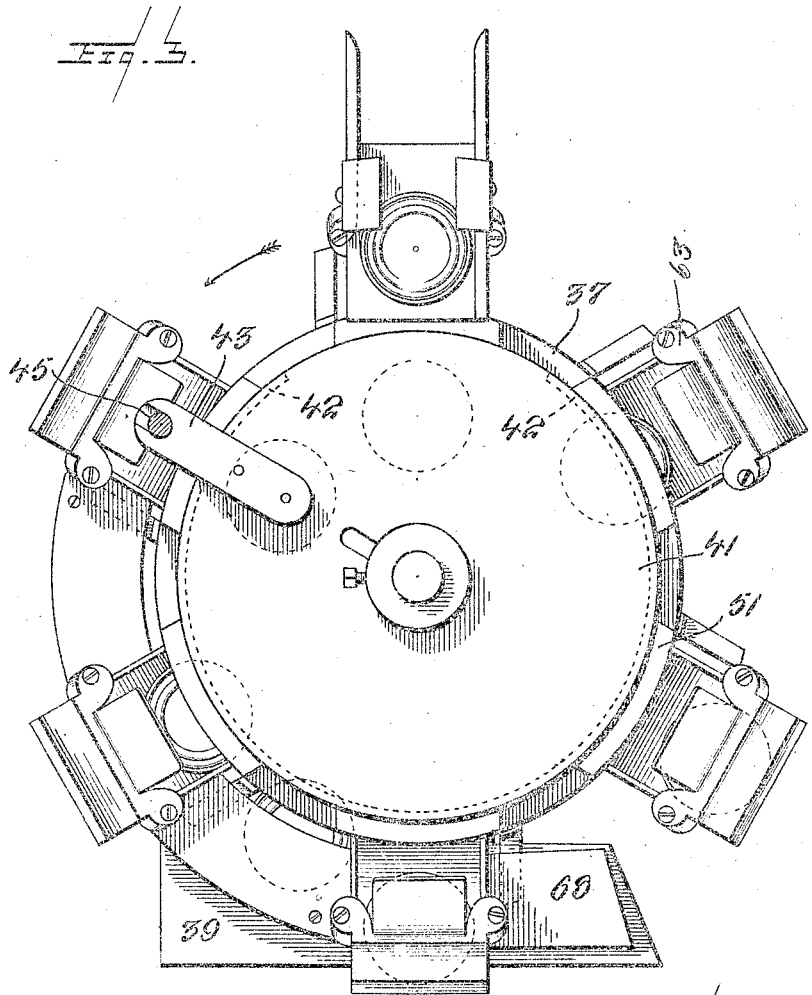
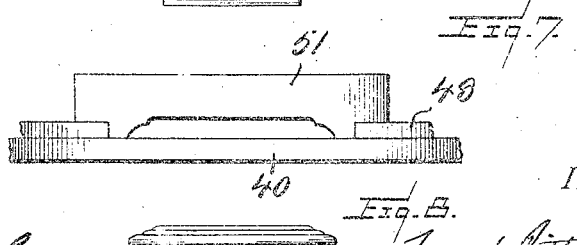
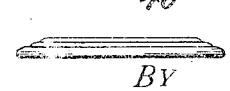
WITNESSES:
INVENTOR
Frank Pitts Ryder
Attorney

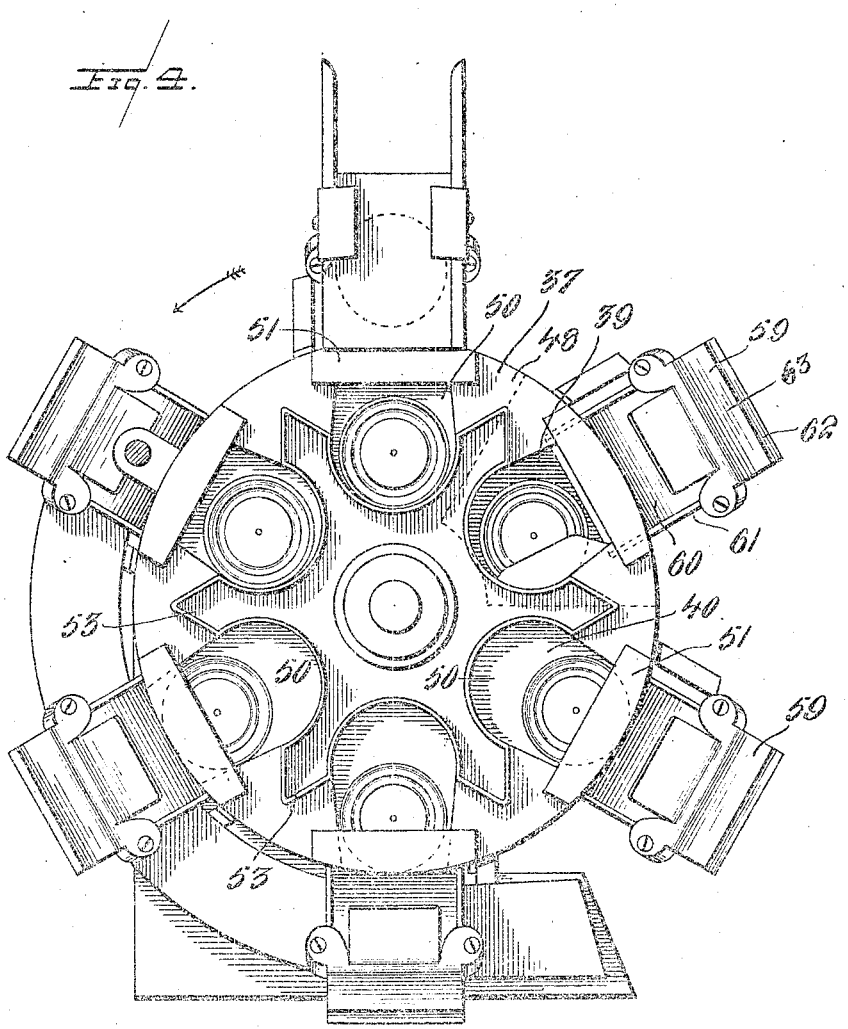

F. P. RYDER.
CAP SORTING AND PLACING MACHINE.
APPLICATION FILED JAN. 19, 1910. RENEWED DEC. 10, 1912.
1,050,565.
Patented Jan. 14, 1913.
13 SHEETS—SHEET 5.
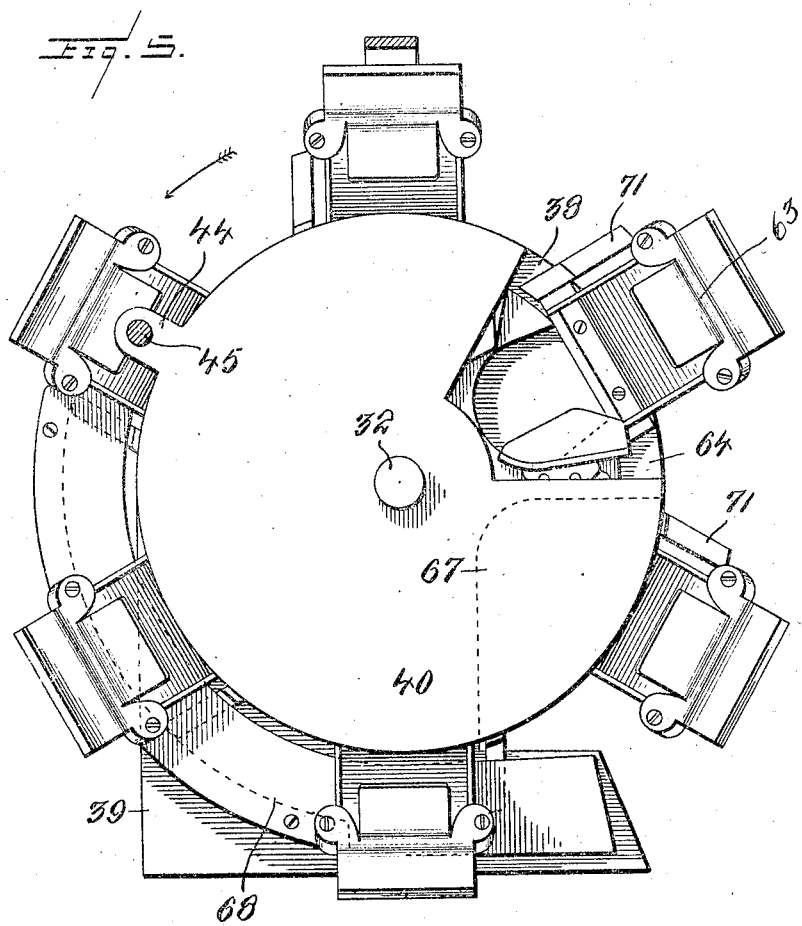
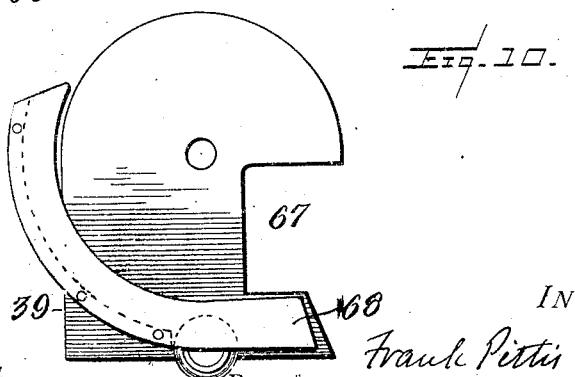

F. P. RYDER.
CAP SORTING AND PLACING MACHINE.
APPLICATION FILED JAN. 19, 1910. RENEWED DEC. 10, 1912.
1,050,565.
Patented Jan. 14, 1913.
13 SHEETS—SHEET 6.
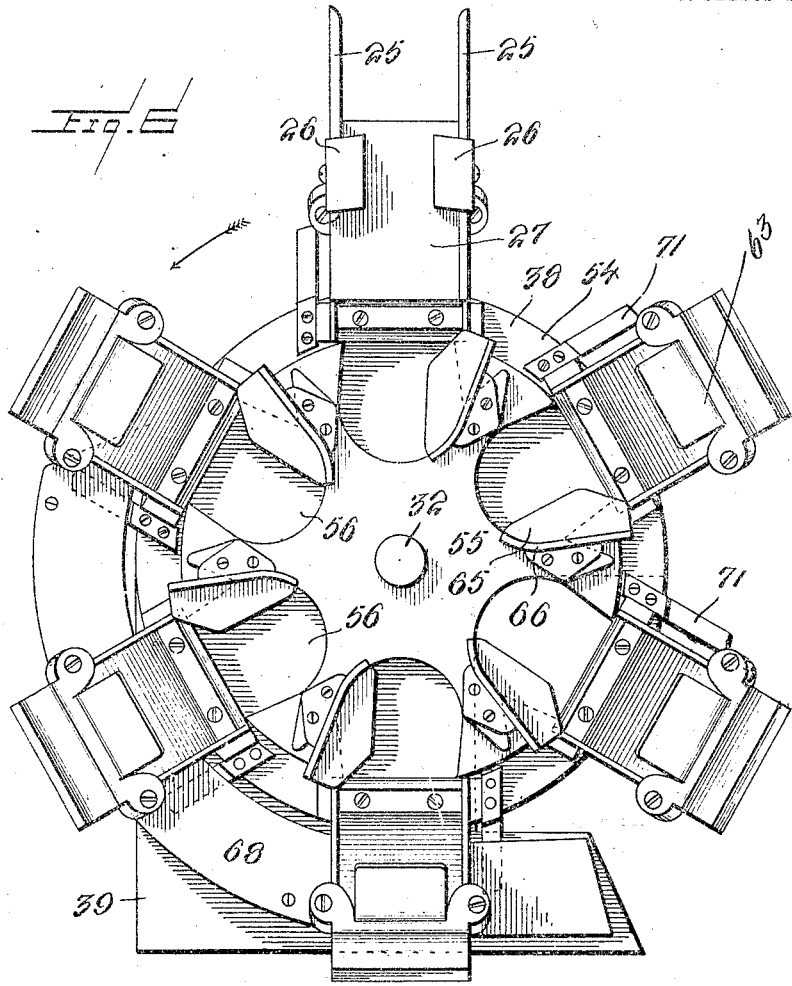
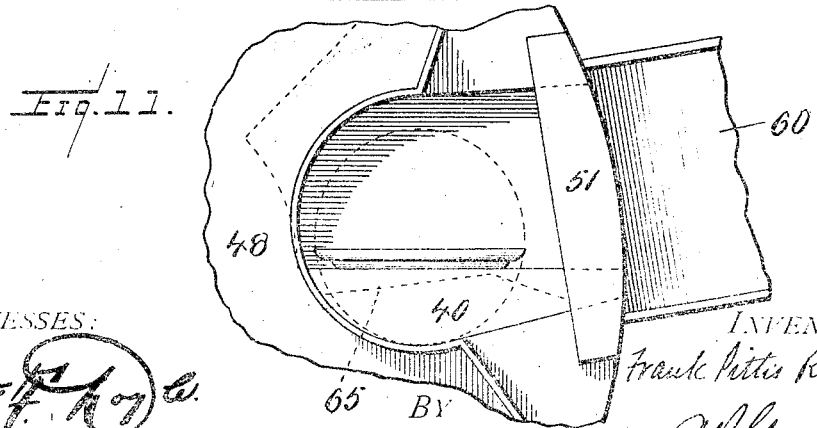

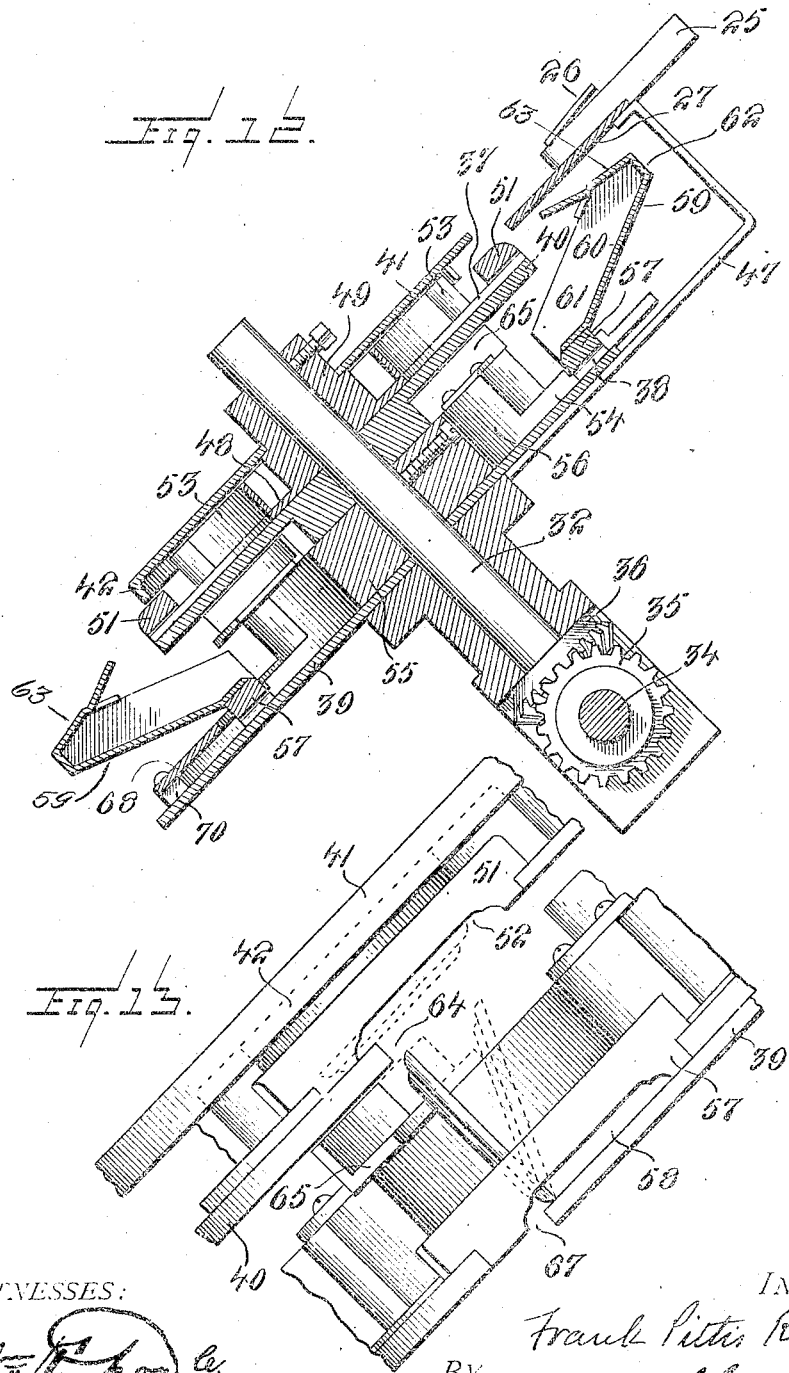

F. P. RYDER.
CAP SORTING AND PLACING MACHINE.
APPLICATION FILED JAN. 19, 1910. RENEWED DEC. 10, 1912.

1,050,565.

Patented Jan. 14, 1913.
13 SHEETS—SHEET 8.

WITNESSES:
Parker Cook

INVENTOR
Frank Pitts Ryan
BY
Attorney

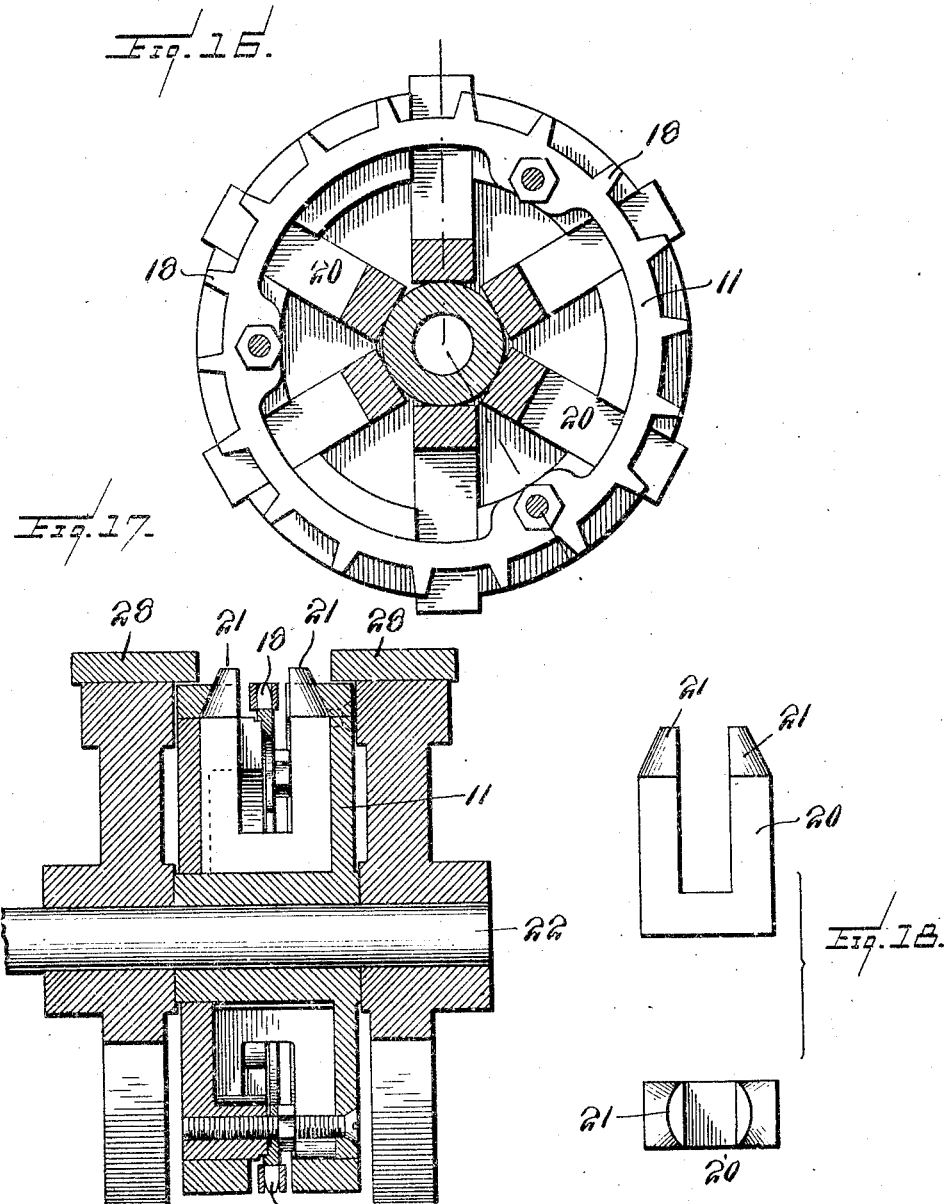

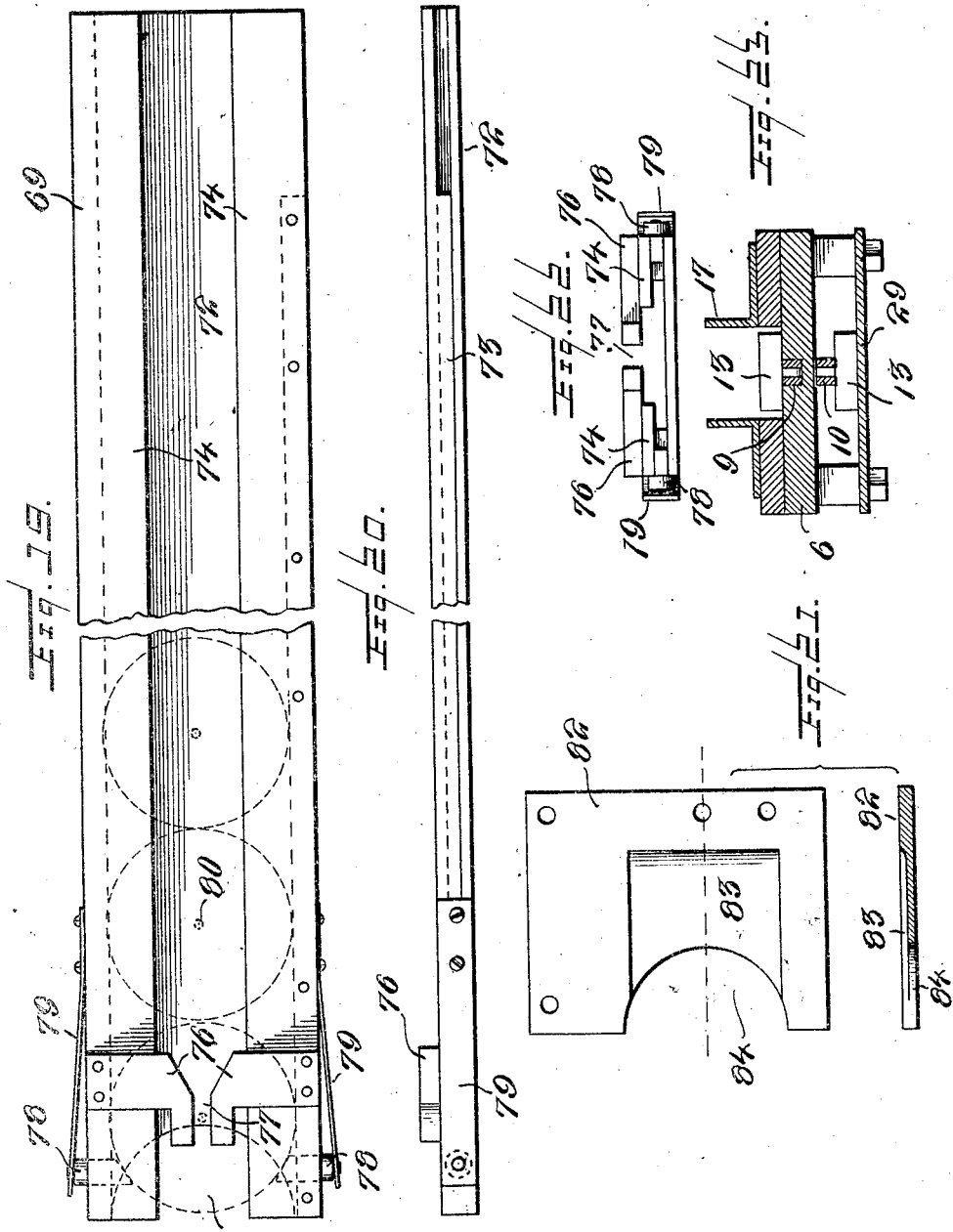

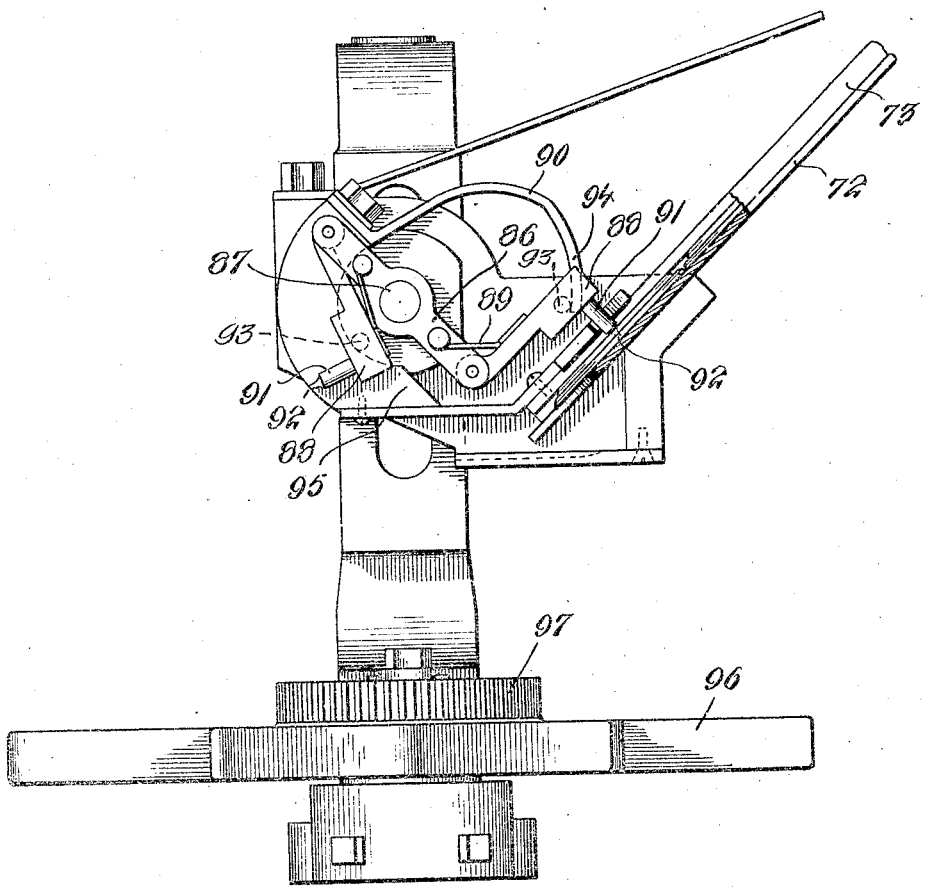

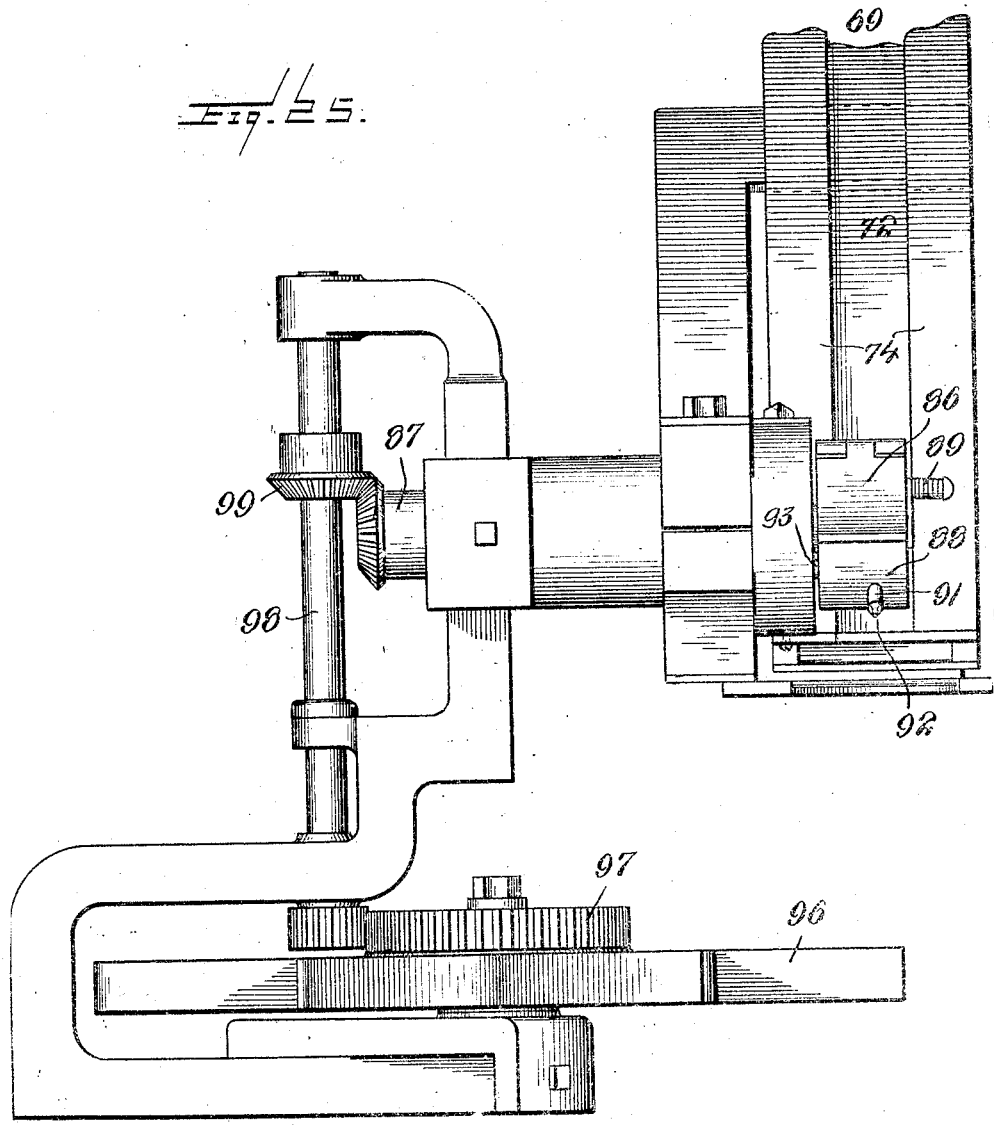

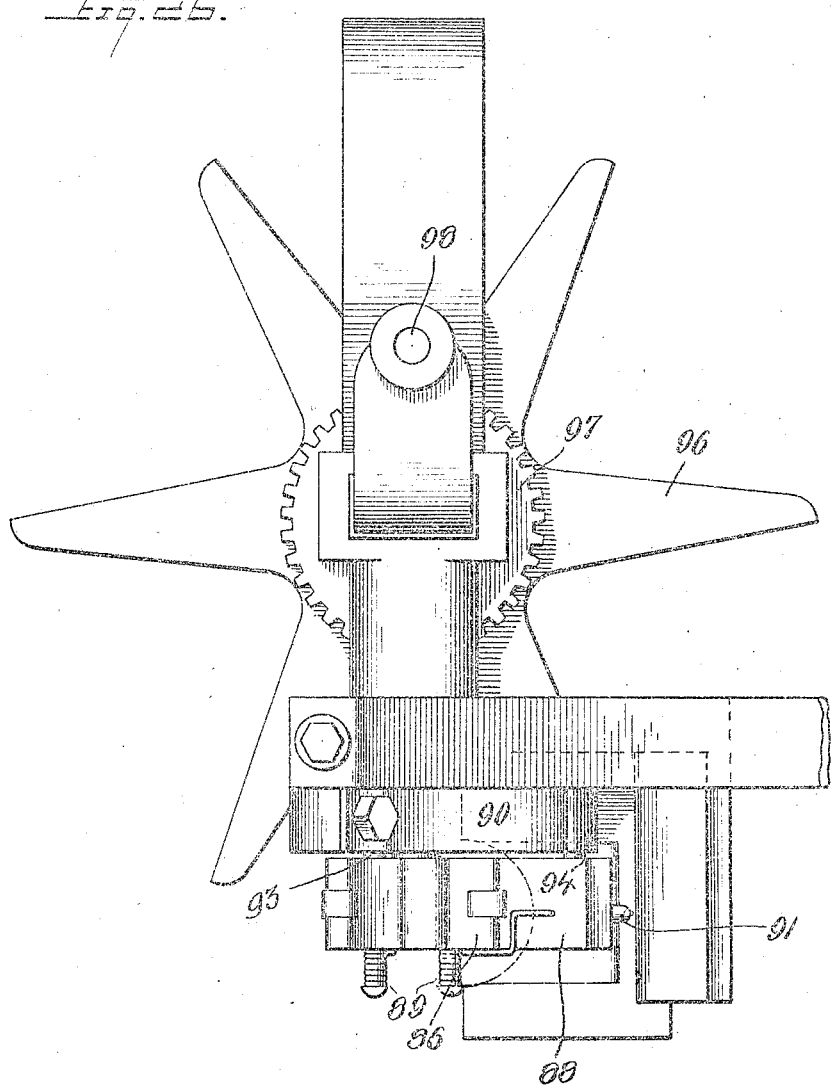

UNITED STATES PATENT OFFICE.

FRANK PITTIS RYDER, OF NIAGARA FALLS, NEW YORK.

CAP SORTING AND PLACING MACHINE.

1,050,565.   Specification of Letters Patent.   Patented Jan. 14, 1913.

Application filed January 19, 1910, Serial No. 538,898. Renewed December 10, 1912. Serial No. 736,044.

*To all whom it may concern:*

Be it known that I, FRANK PITTIS RYDER, a citizen of the United States, residing at Niagara Falls, in the county of Niagara, State of New York, have invented certain new and useful Improvements in Cap Sorting and Placing Machines, of which the following is a description, reference being had to the accompanying drawings, forming a part hereof.

My invention relates to cap sorting and placing machines and has for its object to provide a machine adapted to take can caps from a hopper, deliver them one by one to a sorting device, to sort the can caps so delivered so that defective caps will be eliminated and all the caps will be delivered to a cap placing device right side up, and by the cap placing device will be placed in proper position for soldering upon the tops of cans.

With these and other objects hereinafter explained in view, my invention consists in the construction and combination of elements hereinafter explained and pointed out in the claims.

Figure 14:
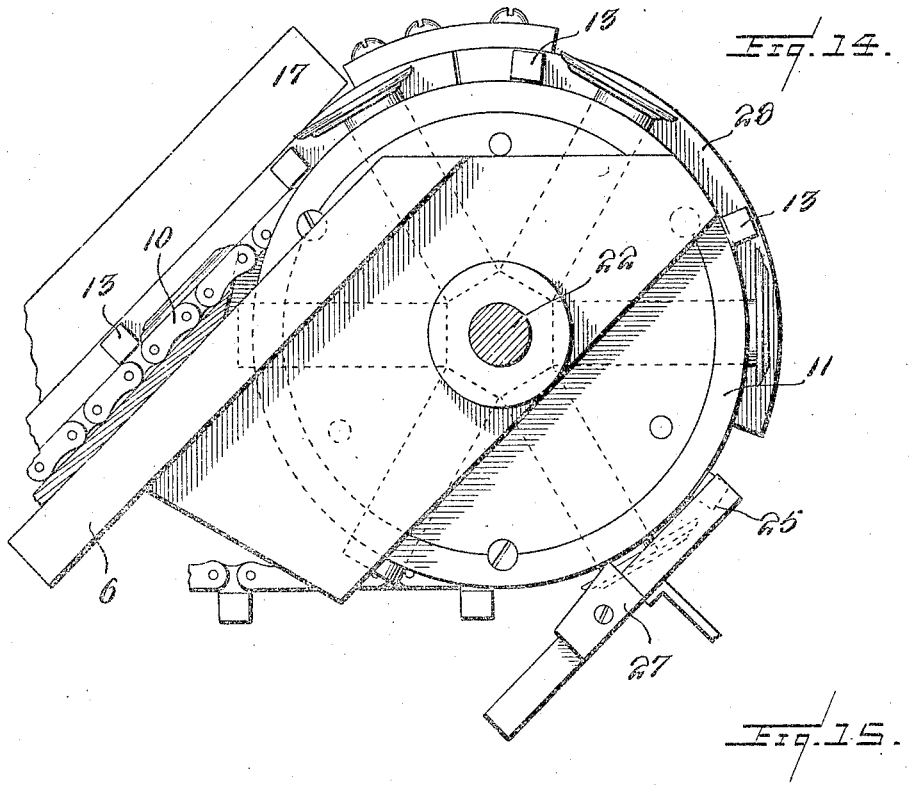
Figure 15:
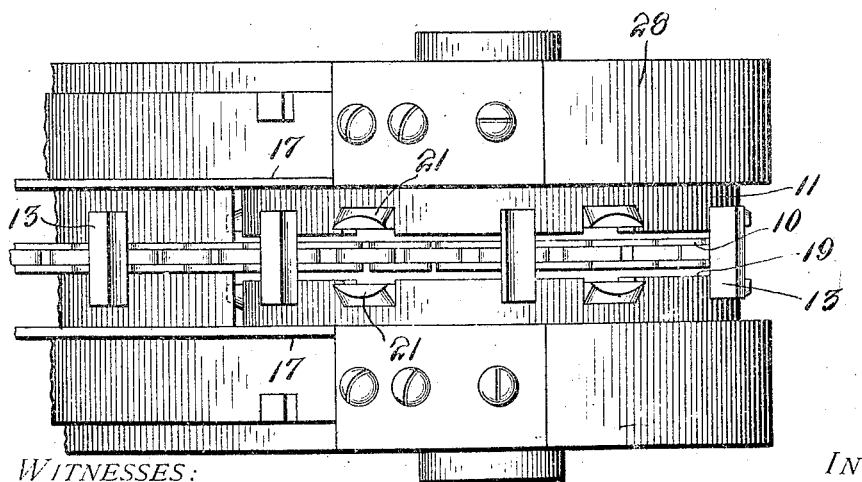

Referring to the drawings: Figure 1 is a side elevation of a complete machine embodying my invention. Fig. 2 is a top plan view of the same machine. Fig. 3 is a detail plan view on an enlarged scale of the double turret by which the can caps are sorted. Fig. 4 is a similar view of the double turret with the cover plate removed. Fig. 5 is a similar view with the cover plate and hopper turret removed. Fig. 6 is a similar view with the cover plate, hopper turret and intermediate plate removed. Fig. 7 is a detail elevation of a portion of the upper turret and intermediate plate removed. Fig. 8 is a perspective view of a can cap. Fig. 9 is a view similar to Fig. 7 showing a can cap in a pocket of the upper turret with concave side upward. Fig. 10 is a plan view on a smaller scale of the fixed plate on which the lower turret is carried. Fig. 11 is a detail view on an enlarged scale of a portion of the turrets illustrating the mechanism for turning the can caps. Fig. 12 is a vertical sectional view through the double turret sorting device. Fig. 13 is a detail view on an enlarged scale illustrating the mechanism for turning the caps. Fig. 14 is a side elevation on an enlarged scale of the magnet carrying wheel. Fig. 15 is a plan view of the same. Fig. 16 is a vertical sectional view through the magnet carrying wheel on a plane at right angles to the axis. Fig. 17 is a similar sectional view on a plane passing through the axis. Fig. 18 shows in side and end view one of the magnets. Fig. 19 is a plan view of the feed chute. Fig. 20 is a side view of the same. Fig. 21 shows in plan and section the guide plate which receives the can cap from the feed chute. Fig. 22 is an end view of the feed chute. Fig. 23 is a cross-sectional view on an enlarged scale of the mechanism for removing the can caps from the hopper to the magnet wheel. Fig. 24 is a side elevation with the cap placer partly broken away. Fig. 25 is an end view of the cap placer. Fig. 26 is a plan view of the cap placer.

In the drawings, 1 indicates a frame work on which the working parts of my machine are carried, 2 indicates a conveyer for cans 3 on which can caps are to be placed.

4 indicates the cap placer by which the caps are, one by one, placed on the cans 3 as they are carried forward by the conveyer 2.

5 indicates a hopper adapted to receive a quantity of can caps which are of the usual dished form having their edges provided with a folded strip or hem of solder. The hopper is secured on one side to an inclined plate 6, the side of the hopper being cut away so that the plate 6 forms a part of the hopper side. The plate 6 is provided with a groove or way 9 in which travels an endless chain 10. The plate 6 extends upward above the level of the top of the hopper and at its upper end a wheel 11 is journaled in the frame work 1 over which the chain 10 passes. At the lower end of the plate 6 below the bottom of the hopper 5 a sprocket wheel 12 is journaled over which the chain 10 passes. The chain 10 carries at suitable intervals cross bars 13 preferably rectangular in cross-section which extend outward on each side of the chain 10 and move on the face of the plate 6. At the bottom of the hopper a spring or flap door 14 is provided adapted to yield to permit the cross bars 13 to, one after the other, pass into the hopper from below, but to prevent the can caps from passing downward out of the hopper. This spring or flap door 14 may be conveniently formed of a piece of sole leather slitted as shown in Fig. 2 and secured in the bottom of the hopper by rivets or the like. Near the upper edge of the hopper are converging guide strips 16. These converging guide strips 16 are continuous with guide strips 17 which extend along the sides of the plate 6 up to the wheel 11 and are spaced apart a distance slightly greater than the diameter of a can cap.

The wheel 11 (see Figs. 14 to 18 inclusive) is provided with sprocket teeth 18 arranged in a groove 19, for engaging the links of the chain 10 and is also provided with a series of radially arranged magnets 20, preferably permanent magnets of horseshoe shape, having their poles 21, 21, extending outward each side of the chain 10 slightly beyond the periphery of the wheel. The magnets are so arranged on the wheel 11 that the pole pieces of a magnet will extend outward between each two cross bars 13 of the chain 10.

The wheel 11 is carried by a shaft 22 arranged to be driven by a pulley 23 from any convenient source of power, and by means of the sprocket teeth 18 the wheel 11 drives the chain 10.

As the wheel 11 rotates it will cause the chain 10 to drag the cross bars 13 upward along the face of the plate 6 and between the guide strips 16, 16 and 17, 17. The cross bars 13 will thus be dragged through the mass of can caps in the hopper and will each carry upward with it one or more of the can caps. The cross bars are preferably made of a thickness sufficiently great to carry with them usually two or more can caps, whether right side up or wrong side up, this being found to be desirable in order to insure the carrying up of at least one can cap. As the can cap or caps are carried upward they will be positioned by the converging guide strip 13 so as to be in proper alinement, and they will pass upward between the guide strips 17 to the wheel 11. As the chain 10 is engaged by the sprocket teeth 18 the can cap 8 which rests on the chain, (see Fig. 14) comes in contact with and is attracted by the poles 21 of a magnet 20 and as the chain passes about the wheel this can cap will be so held by the magnet that it will not fall off. But as the can cap which rests on the chain serves as an armature for the magnet 20, the attractive force of the magnet does not extend to any of the other can caps which may have been carried up by the cross bar 13 so that all of the can caps except the one next to the chain will be free to fall off when the chain in passing about the wheel 11 ceases to serve as a support. These excess can caps as they fall from the chain are caught by an inclined chute 24 down which they slide back to the hopper 5. As the wheel 11 continues to rotate the can cap still held by the attractive force of the magnet is brought in contact with a pair of guide arms 25, 25 carried by a guide chute 27 arranged below the upper end of the chute 24, each provided with an inwardly extending stripper finger 26, so located that the portions of the can cap extending laterally beyond the pole pieces 21 must pass beneath them with the result that the can cap is stripped from the magnet and is free to fall into guide chute 27.

For the purpose of preventing accidental displacement of the can caps as they pass about the wheel 11 guides 28, 28 are provided on each side of the wheel 11 extending to a point immediately above the guide arms 25, 25. The chain 10 passes from the wheel 11 onto guides 29 which are curved as shown in order to hold the chain in contact with the wheel 11 to a point directly below its axis so as to prevent the can cap held by the magnet from being pulled away before it comes in contact with the stripping fingers 26. From the guides 29 the sprocket chain 10 in its return movement passes beneath a weighted tension device consisting of a sprocket wheel 30 carried by pivoted arms 31, back to sprocket wheel 12.

It will be clear that the mechanism so far described will serve to pick up can caps from the hopper and deliver them one by one to the guide chute 27. The caps so delivered to the guide chute may be either concave or convex side up and some of them may be bent out of shape or otherwise defective. In order to be properly placed on the cans the caps must all be convex side up and bent or otherwise defective caps must be eliminated. For the purpose of eliminating defective caps and causing all of the caps to be delivered to the cap placing device right side up, that is convex side up, I provide the turret device hereinafter described, to receive the can caps from the guide chute 27.

Journaled in the frame-work 1 of the machine below the wheel 11 is a shaft 32 at right angles to the shaft 22 of the wheel 11. This shaft 32 is arranged to be driven from the shaft 22 through any convenient means such as a sprocket chain 33, shaft 34 and bevel gears 35, 36. On the shaft 32 are secured two turret wheels 37 and 38. The lower turret wheel 38 rotates on a fixed plate 39 carried by a suitable portion of the frame 1. The upper turret wheel 37 rotates on an intermediate plate 40 which rests on the hub of the lower turret 38. On the hub of the turret 37 rests a cover plate 41 having a down-turned flange 42. The cover plate 41 and intermediate plate 40 are secured against rotation by any convenient means. A convenient means for this purpose consists in a radially projecting arm 43 on the intermediate plate 40 and a corresponding radial arm 44 on the cover plate 41 and a pin 45 carried by a bracket 46 and adapted to engage the arms 43 and 44. Secured to the fixed plate 39 is a bracket 47 on the upper end of which the guide chute 27 is secured.

The upper turret 37 consists of a disk 48 having a central hub 49 and having radial recesses or pockets 50 extending inward from its periphery at regular intervals. The disk 48 is formed of a thickness about that of the height of a can cap and across the outer end of each pocket 50 is arranged a bar 51 which is cut away as shown (see Figs. 7, 9 and 13) to form a recess 52 of the precise shape of a can cap in diametrical cross-section, the recess being just enough larger than the cross-section of the can cap to permit a can cap to pass through it if of perfect shape and convex side up, but not sufficiently large to permit a can cap to pass through it if bent or distorted or if concave side up.

On the upper face of the disk 48 and extending radially outward between the pockets 50 are guide arms 53 preferably tapered at their outer ends. These arms 53 are preferably formed by a strip of sheet metal bent to follow the inner ends of the pockets 50 and to extend outward on the upper face of the disk 48 between the pockets and suitably secured to the disk by brazing or otherwise.

The bars 51 are of such thickness and the turret is so arranged that as it is rotated the upper surface of the bar will be about in line with and below the guide chute 27 so that a can cap sliding downward from the guide chute 27 will pass over the bar 51 and be caught in the pocket 50. In order to permit of the free entrance of a can cap into the pocket 50 from the guide chute 27 the flange 42 of the cover plate 41 is cut away opposite the guide chute (see Fig. 12).

The lower turret 38 comprises a disk portion 54 which rotates in contact with the fixed plate 39, and a hub portion 55 of considerably greater thickness than the disk portion. In the disk portion and also extending into the hub portion, are formed radial pockets 56 corresponding in number and shape with the pockets 50 of the upper turret each adapted to receive a can cap. Across the outer ends of these pockets are arranged bars 57 (see Fig. 12) similar to the bars 51 of the upper turret, cut away on their under sides to form recesses 58 of the same shape and size as the recesses 52 of the bars 51 of the upper turret (see Fig. 13).

Secured to the upper faces of each of the bars 57 is a radially outwardly extending pocket 59 having inclined bottom 60, and sides 61, 61 and closed at its outer end 62 and partly covered from its outer end inward as shown at 63 (see Fig. 12).

In the operation of the double turret as thus far described a can cap, if convex side up and not defective, delivered into the guide chute 27 will slide over the bar 51 into a pocket 50 and as the turret revolves in the direction of the arrow, Figs. 3, 4, 5, and 6, will be carried forward until the pocket carrying it is at its lowest point, that is opposite the point at which it received the cap from the guide chute. The turret being at such an inclination that the can cap will slide off it by gravity, it will, being right side up and not bent or otherwise defective, pass through the recess 52 beneath the bar 51 and drop into a pocket 59. As the turret continues to rotate the pocket 59 carrying the can cap will be brought around to a point immediately below the guide chute 27 and by reason of the inclination of the bottom 60 the can cap will slip down over the bar 57 into the pocket 56. It will then be carried forward as before until the pocket carrying it is at its lowest point, that is diametrically opposite the point at which it received the cap, when the cap will slip out through the recess 58 beneath the bar 57 and be discharged from the turret.

For the purpose of discharging caps which are either concave side up or are bent so that they will not pass through the recess 52 in the bar 51, the intermediate plate 40 is cut away to leave an opening 64 (see Figs. 5 and 13) beginning on about the horizontal diameter of the plate and extending about two thirds of the distance to the vertical diameter. This opening 64 is sufficiently large to permit a can cap to drop through it. On the hub portion 55 of the lower turret 38 on the rearward side of each pocket 56 is secured a turning plate 65 (see Figs. 5, 6, 12 and 13) which extends partly over the pocket and at its rear edge has a flange 66 in line with the rear side of the pocket.

If a can cap which slips from the guide chute 27 into a pocket 50 of the upper turret is concave side up or is so bent or otherwise defective that it will not slip through the recess 52 beneath the bar 51 when the pocket 50 is at the lowest point in its rotation, it will be carried past this lowest point upward toward the point at which it entered the pocket. But before it reaches this point it is carried over the opening 64 through which it falls in such a way as to at first stand on edge in the pocket 56 (see Fig. 13) resting against the forward edge of the turning plate 65. As the thickness of the hub portion 55 of the lower turret 38 and, consequently, the depth of the pocket 56, is greater than the semidiameter of the can cap, the turning plate 65 will strike the can cap above its center and as the lower portion of the can cap is not prevented from moving rearward in the pocket, the further forward rotation of the turret will throw the upper portion of the can cap forward as indicated by dotted lines in Fig. 13 causing it to fall concave side downward in the pocket 56. The can cap is thus turned convex side up and will be carried forward in the pocket until the pocket reaches the lowest point in its rotation when it will slip out through the recess 58 beneath the bar 57 and will thus be discharged from the turret right side up. If the can cap should be bent or otherwise incapable of slipping through the recesses 52 and 58 it will, after dropping through the opening 64 into the pocket 59 of the lower turret, be carried past the lower point and be brought over an opening 67 (see Fig. 10 and dotted lines Fig. 5) in the fixed plate 39 through which it drops into any suitable receptacle (not shown).

After its discharge from the turret the can cap slips over the fixed plate 39 between it and a guide plate 68 into the upper end of a feed chute 69 from the lower end of which the can caps are withdrawn one by one by the cap placer as hereinafter described. This guide plate 68 extends upward along the periphery of the disk portion of the lower turret as shown in Fig. 10 being spaced away from the fixed plate 39 by a spacing strip 70 parallel with the periphery of the disk portion, see Fig. 12. The guide way thus formed is adapted to receive the clearing arms 71 carried by the disk portion 54 of the lower turret in advance of each of the pockets 59. In case the can caps are discharged from the turret faster than they are withdrawn from the lower end of the feed chute 69, the arms 71 will push any cap projecting above the end of the feed chute away from the mouth of the chute so that there will be no chance of the mouth of the chute becoming choked.

The feed chute 69 extends from the fixed plate 39 to the cap placer 4 and consists in its main portion of a bottom plate 72, sides 73 and top plates 74 extending inward from the sides 73 a sufficient distance to guide the caps and at the same time leaving sufficient space between their inner edges to permit the can caps to be reached and moved downward or upward to clear the chute if necessary. The sides 73 are preferably formed integral with the top plates 74 and one of the sides 73 is preferably cut away at its upper end as shown at 75 to permit of readily clearing the chute of caps.

Near its lower end the feed chute is provided on the upper faces of the top plates 74 with inwardly extending arms 76 having their inner ends shaped to form a guide passage 77 between them flaring at its upper end as shown in Fig. 19. Through the sides 73 near the lower end of the chute extend stop pins 78 having their inner ends beveled to fit the periphery of a can cap. These stop pins are each carried by a spring 79 secured at one end to one of the sides 73. The feed chute is adapted to feed the can caps downward until the lowermost one comes in contact with the yielding stop pins 78. The lowermost cap will then rest with its vent hole 80 in line with the passage 77 between the inner ends of the arms 76.

The bottom plate 72 of the feed chute is cut away at its lower end to form a semicircular recess 81 of slightly larger diameter than the diameter of the can cap. Beneath the lower end of the feed chute is arranged a plate 82 having a recess 83 in its upper face and having in its end away from the feed chute a semicircular recess 84 of a diameter slightly larger than the diameter of the can cap. The plate 82 is supported by bracket 85 at a height just sufficient to permit the cans 3 to pass beneath it, so that when a can is in position a can cap forced past the yielding stop pins 78 will drop through the semicircular recess 81 into the recess 83 of the plate 82 and continuing its movement will drop through the semicircular recess 84 onto the top of the can.

For the purpose of forcing the can cap past the stop pins 78 and moving it onto the plate 82 and from the plate 82 onto the can top, the cap placer 4 is provided with arms 86 carried on a horizontal shaft 87, the said arm having hinged extensions 88 pressed outward by springs 89 and forced inward, as the shaft 87 rotates, by fixed cam guides 90. The extensions 88 are each provided with a pin 91 having a point 92 adapted to enter the vent hole 80 of a can cap. The fixed cam guides 90 are engaged by lateral pins 93 on the hinged extensions 88. The fixed cam guide 90 terminates at 94 directly opposite the passage 77 between the inwardly extending arms 76 on the feed chute and as the fixed cam guide 90 is for a portion of its length near its end 94 nearly vertical it will permit the end of the hinged extension 88 to move toward the feed chute to cause the point 92 of its pin 91 to enter the vent hole 80 of the can cap which is at the lower end of the feed chute resting against the stop pins 78. As the shaft 87 continues to rotate the guide pin 93 passes the end 94 of the fixed cam guide dragging the can cap past the stop pins 78 and causing it to drop through the semicircular recess 81 onto the plate 82. As the hinged extension 88 is no longer restrained by the fixed cam guide it will by reason of its spring 89 follow the can cap without having its pin 91 disengaged from the vent hole 80 and as the shaft continues to rotate the hinged extension 88 will drag the can cap along over the plate 82 until it falls through the semicircular recess 84 onto the top of a can. As soon as the cap is thus placed on the can top the lateral pin 93 of the hinged extension strikes the portion 95 of the fixed cam guide and as it rides up this portion of the cam guide its pin 91 is quickly withdrawn from the vent hole 80 of the can cap leaving the cap in place on the can top.

In order that the cap placer 4 may be operated at the proper time it is arranged to be driven in time with the movement of the cans on the conveyer. In the present machine this movement is secured by a star wheel 96 arranged in position to be operated by the cans as is common in canning house machinery. The star wheel 96 carries a gear 97 which drives a vertical shaft 98 which through bevel gears 99 drives the shaft 87.

It will of course be understood that the plate 6 is inclined as shown so that the can caps in the hopper will rest against it in position to be caught by the cross bars 13, and that the shaft 32 carrying the turrets 37 and 38 is inclined at such an angle as shown that the can caps will slide down on the plates 39 and 40 by their own gravity so as to pass out of the pockets 50 and 56 through the recesses beneath the bars 51 and 57, and it will also be understood that the feed chute 69 is so inclined as shown that the can caps will slide down it by their own gravity. The tendency of the can caps to slide out of the pockets by gravity is aided by the centrifugal force of the rapid rotation of the turrets. By reason of this centrifugal force the can caps in the pockets 50 of the upper turret will slip beneath the bars 51 to a greater or less extent before they reach the lowest point in the rotation of the pockets. As, however, there is always a pocket 59 of the lower turret opposite each of the pockets 50 any can cap which may slip through will be caught. In case a can cap carried in a pocket 56 of the lower turret slips partly through the recess beneath the bar 57 before it reaches the lowest point of the rotation of the pockets it will be prevented from passing entirely out from beneath the bar 57 by the spacing strip 70 and the guide plate 68.

It will of course be understood that the drawings and description herein are illustrative merely and are not intended to restrict the invention to the precise construction or arrangement shown and described, as it is obvious that many changes in form, details of construction and arrangement may be made without departing from the spirit of the invention.

It will also be understood that while the machine of my invention is particularly designed and intended for sorting and placing can caps it may be used for sorting other disk-shaped articles and parts of it may be used for sorting or placing articles of non-magnetic material.

Having thus described my invention, what I claim is:—

1. The selecting wheel provided with a series of radially arranged magnets, in combination with the chain passing over said wheel and provided with means for engaging can caps to convey them into position to be engaged by the magnets.

2. The selecting wheel provided with a series of radially arranged magnets, each adapted to engage a can cap, in combination with the chain passing over said wheel and provided with means each adapted to engage a plurality of can caps to convey them simultaneously to the selecting wheel.

3. The selecting wheel having sprocket teeth and having radially arranged magnets having their poles on opposite sides of the sprocket teeth and a chain engaging the sprocket teeth and provided with means for conveying can caps to the selecting wheel.

4. The combination with means for sorting can caps, of means for conveying the can caps from a source of supply, and means for selecting the can caps and delivering them one by one to the sorting means.

5. The combination with means for sorting can caps, of means for simultaneously conveying a plurality of can caps from a source of supply, and means for selecting the can caps and delivering them one at a time to the sorting means.

6. A sorting device for can caps comprising a turret having a radially arranged pocket therein adapted to receive a can cap, and arranged to rotate on an inclined axis, a bar across the mouth of the pocket having a recess in its under side adapted to permit the can cap to pass through only when its convex side is upward, a plate on which the turret rotates having a portion thereof cut away to permit a can cap retained by the bar, to drop through it, and means for supplying can caps to the pocket.

7. A sorting device for can caps comprising a turret having a radially arranged pocket therein adapted to receive a can cap, and arranged to rotate on an inclined axis, a bar across the mouth of the pocket having a recess in its under side adapted to permit the can cap to pass through only when its convex side is upward, a plate on which the turret rotates having a portion thereof cut away to permit a can cap retained by the bar, to drop through it, and means for supplying can caps, one by one, to the pocket.

8. A sorting device for can caps comprising a pair of turrets mounted to rotate on the same inclined axis one above the other each provided with a radially arranged pocket adapted to receive a can cap, the pockets in the two turrets being in line, a bar across the outer end of each turret having a recess in its under side adapted to permit a can cap to pass through only when its convex side is upward and a non-rotary intermediate plate between the two turrets forming the bottom for the pocket of the upper turret, said intermediate plate having formed therein an opening adapted to permit a can cap to pass through it from the pocket of the upper turret to the pocket of the lower turret.

9. A sorting device for can caps comprising a pair of turrets mounted to rotate on the same inclined axis one above the other each provided with a radially arranged pocket adapted to receive a can cap, the pockets in the two turrets being in line, a bar across the outer end of each turret having a recess in its under side adapted to permit a can cap to pass through only when its convex side is upward, a non-rotary intermediate plate between the two turrets said plate forming the bottom for the pocket of the upper turret, said intermediate plate having formed therein an opening adapted to permit a can cap to pass through it from the pocket of the upper turret to the pocket of the lower turret, and a turning plate carried by the lower turret and extending over a portion of the pocket.

10. In a sorting device for can caps, a turret mounted to rotate on an inclined axis having a radially arranged pocket adapted to receive a can cap formed therein, a non-rotary plate above the turret having an opening therein adapted to permit a can cap to pass through it, a turning plate carried by the turret extending over a portion of the pocket, and means for supplying can caps to said opening in the intermediate plate.

11. In a sorting device for can caps, a turret mounted to rotate on an inclined axis having a radially arranged pocket adapted to receive a can cap formed therein, a bar across the outer end of the pocket having a recess in its under side adapted to permit a can cap to pass through it only when the convex side of the can cap is upward, a non-rotary plate above the turret having an opening therein adapted to permit a can cap to pass through it, and a fixed plate on which the turret rotates and which forms the bottom of the pocket said fixed plate having an opening therein adapted to permit a can cap to pass through it, the openings in the two plates not being in line.

12. In a sorting device for can caps, a turret mounted to rotate on an inclined axis having a radially arranged pocket adapted to receive a can cap formed therein, a bar across the outer end of the pocket having a recess in its under side adapted to permit a can cap to pass through it only when the convex side of the can cap is upward, a non-rotary plate above the turret having an opening therein adapted to permit a can cap to pass through it, a fixed plate on which the turret rotates and which forms the bottom of the pocket said fixed plate having an opening therein adapted to permit a can cap to pass through it, the openings in the two plates not being in line, and a turning plate carried by the turret and extending over a portion of the pocket.

13. In a sorting device for can caps, an inclined fixed plate, a rotary shaft extending through the fixed plate at right angles thereto, a turret secured to the shaft and rotating on the fixed plate and provided with a series of radial pockets each adapted to receive a can cap, a cross bar across the outer end of each pocket having a recess therein adapted to permit a can cap to pass through it only when its convex side is upward, means for delivering can caps to the pockets over the cross bar when the pockets are over the upper portion of the inclined fixed plate, and a feed chute in position to receive the can caps from the pockets when they are over the lower portion of the inclined fixed plate.

14. In a sorting device for can caps, an inclined fixed plate, a rotary shaft extending through the fixed plate at right angles thereto, a turret secured to the shaft and rotating on the fixed plate and provided with a series of radial pockets each adapted to receive a can cap, a cross bar across the outer end of each pocket having a recess therein adapted to permit a can cap to pass through it only when its convex side is upward, means for delivering can caps to the pockets over the cross bar when the pockets are over the upper portion of the inclined fixed plate, a feed chute in position to receive the can caps from the pockets when they are over the lower portion of the inclined fixed plate, and a guide plate extending along the fixed plate in front of the outer ends of the pockets.

15. In a sorting device for can caps, an inclined fixed plate, a rotary shaft extending through the fixed plate at right angles thereto, a turret secured to the shaft and rotating on the fixed plate and provided with a series of radial pockets each adapted to receive a can cap, a cross bar across the outer end of each pocket having a recess therein adapted to permit a can cap to pass through it only when its convex side is upward, means for delivering can caps to the pockets over the cross bar when the pockets are over the upper portion of the inclined fixed plate, a feed chute in position to receive the can caps from the pockets when they are over the lower portion of the inclined fixed plate, a guide plate extending along the fixed plate in front of the outer ends of the pockets and radial arms carried by the turret extending between the guide plate and the fixed plate.

16. In a sorting device for can caps, an inclined fixed plate, a rotary shaft extending through the fixed plate at right angles thereto, a turret secured to the shaft and rotating on the fixed plate and provided with a series of radial pockets each adapted to receive a can cap, a cross bar across the outer end of each pocket having a recess therein adapted to permit a can cap to pass through it only when its convex side is upward, means for delivering can caps to the pockets over the cross bar when the pockets are over the upper portion of the inclined fixed plate, a feed chute in position to receive the can caps from the pockets when they are over the lower portion of the inclined fixed plate, and means for withdrawing can caps one at a time from the lower end of the feed chute.

17. A sorting device for can caps comprising a fixed plate arranged at an inclination, a rotary shaft extending through the fixed plate at right angles thereto, a turret secured to the shaft and rotating on the fixed plate and provided with a series of radial pockets each adapted to receive a can cap, an intermediate plate supported by the turret and held against rotation, an upper turret secured to the shaft and rotating on the intermediate plate and provided with a series of radial pockets each adapted to receive a can cap, a delivery chute above the upper end of the fixed plate in position to deliver can caps into the pockets of the upper turret and a feed chute having its mouth at the lower end of the fixed plate to receive can caps from the pockets of the lower turret.

18. A sorting device for can caps comprising a fixed plate arranged at an inclination, a rotary shaft extending through the fixed plate at right angles thereto, a turret secured to the shaft and rotating on the fixed plate and provided with a series of radial pockets each adapted to receive a can cap, an intermediate plate supported by the turret and held against rotation, an upper turret secured to the shaft and rotating on the intermediate plate and provided with a series of radial pockets each adapted to receive a can cap, a delivery chute above the upper end of the fixed plate in position to deliver can caps into the pockets of the upper turret, a feed chute having its mouth at the lower end of the fixed plate to receive can caps from the pockets of the lower turret, and means for supplying can caps one at a time to the delivery chute.

19. The combination with a conveyer adapted to convey cans, of a feed chute for can caps having its lower end in position to deliver can caps to the tops of the cans, means for supplying can caps to the chute, yielding means for holding the can caps in the chute, and a cap placing device operated by the movement of the cans provided with means for engaging the lowermost can cap in the chute and forcing said can cap past the holding means onto a can.

20. The combination with a conveyer adapted to convey cans, of a feed chute for can caps having its lower end in position to deliver can caps to the tops of the cans, means for supplying can caps to the chute, yielding means for holding the can caps in the chute, and a cap placing device provided with means for engaging the vent hole of the lowermost can cap in the chute and for moving said engaging means to force said can cap past the holding means onto a can.

21. The combination with a conveyer adapted to convey cans, of a feed chute for can caps having its lower end in position to deliver can caps to the tops of the cans, means for supplying can caps to the chute, yielding means for holding the can caps in the chute, and a cap placing device provided with means operated by the movement of the cans for engaging the vent hole of the lowermost can cap in the chute and for moving said engaging means to force said can cap past the holding means onto a can.

22. The combination with a conveyer adapted to convey cans, of a feed chute for can caps having its lower end in position to deliver can caps to the tops of the cans, means for supplying can caps to the chute, yielding means for holding the can caps in the chute, and a cap placing device provided with means for engaging the lowermost can cap in the chute to force it past the holding means onto a can, said can cap engaging means comprising a rotary arm carrying a pin adapted to enter the vent hole of a can cap.

23. The combination with a conveyer adapted to convey cans, of a feed chute for can caps having its lower end in position to deliver can caps to the tops of the cans, means for supplying can caps to the chute, yielding means for holding the can caps in the chute, and a cap placing device provided with means for engaging the lowermost can cap in the chute to force it past the holding means onto a can, said can cap engaging means comprising a hinged rotary arm carrying a pin adapted to enter the vent hole of a can cap.

24. The combination with a conveyer adapted to convey cans, of a feed chute for can caps having its lower end in position to deliver can caps to the tops of the cans, means for supplying can caps to the chute, yielding means for holding the can caps in the chute, and a cap placing device provided with means for engaging the lowermost can cap in the chute to force it past the holding means onto a can, said can cap engaging means comprising a hinged arm rotating about a horizontal shaft and provided with cap engaging means, and means for moving the end of the hinged arm toward and away from the axis of rotation of the arm.

25. The combination with a conveyer adapted to convey cans, of a feed chute for can caps having its lower end in position to deliver can caps to the tops of the cans, means for supplying can caps to the chute, yielding means for holding the can caps in the chute, and a cap placing device provided with means operated by the movement of the cans for engaging the lowermost can cap in the chute to force it past the holding means onto a can, said can cap engaging means comprising a hinged arm rotating about a horizontal shaft and provided with cap engaging means, and means for moving the end of the hinged arm toward and away from the axis of rotation of the arm.

26. The combination with a conveyer adapted to convey cans, of a feed chute for can caps having its lower end in position to deliver can caps to the tops of the cans, means for supplying can caps to the chute, yielding means for holding the can caps in the chute, and a cap placing device provided with means for engaging the lowermost can cap in the chute to force it past the holding means onto a can, said can cap engaging means comprising a hinged arm rotating about a horizontal axis and provided with cap engaging means, a spring for moving the end of the hinged arm outward and a fixed cam for causing the end of the hinged arm to be moved inward toward the axis of rotation of the arm.

27. The combination with a conveyer adapted to convey cans, of a feed chute for can caps having its lower end in position to deliver can caps to the tops of the cans, means for supplying can caps to the chute, yielding means for holding the can caps in the chute, and a cap placing device provided with means operated by the movement of the cans for engaging the lowermost can cap in the chute to force it past the holding means onto a can, said can cap engaging means comprising a hinged arm rotating about a horizontal axis and provided with cap engaging means, a spring for moving the end of the hinged arm outward and a fixed cam for causing the end of the hinged arm to be moved inward toward the axis of rotation of the arm.

28. The combination with a conveyer adapted to convey cans, of a feed chute for can caps having its lower end in position to deliver can caps to the tops of the cans, means for supplying can caps to the chute, yielding means for holding the can caps in the chute, and a cap placing device provided with means for engaging the lowermost can cap in the chute to force it past the holding means onto a can, said can cap engaging means comprising a rotary arm carried on a horizontal shaft having its outer end movable toward and away from the axis of rotation and provided with cap engaging means, means for moving the outer end of the arm into engagement with the lowermost can cap in the chute and means for causing the end of the arm to be moved inward to cause it to be disengaged from the can cap.

29. The combination with a conveyer adapted to convey cans, of a feed chute for can caps having its lower end in position to deliver can caps to the tops of the cans, means for supplying can caps to the chute, yielding means for holding the can caps in the chute, and a cap placing device provided with means operated by the movement of the cans for engaging the lowermost can cap in the chute to force it past the holding means onto a can, said can cap engaging means comprising a rotary arm carried on a horizontal shaft having its outer end movable toward and away from the axis of rotation and provided with cap engaging means, means for moving the outer end of the arm into engagement with the lowermost can cap in the chute and means for causing the end of the arm to be moved inward to cause it to be disengaged from the can cap.

30. The combination with a conveyer adapted to convey cans, of a feed chute for can caps having its lower end in position to deliver can caps to the tops of the cans, means for supplying can caps to the chute, yielding means for holding the can caps in the chute, and a cap placing device provided with means for engaging the lowermost can cap in the chute to force it past the holding means onto a can, said can cap engaging means comprising a rotary arm rotating about a horizontal axis having its outer end movable toward and away from the axis of rotation and provided with a pin adapted to enter the vent hole of a can cap, means for moving the pin outward to engage the vent hole of the lowermost can cap in the chute, and means for moving the pin inward toward the axis of rotation to disengage it from the can cap.

31. The combination with a conveyer adapted to convey cans, of a feed chute for can caps having its lower end in position to deliver can caps to the tops of the cans, means for supplying can caps to the chute, yielding means for holding the can caps in the chute, and a cap placing device provided with means operated by the movement of the can for engaging the lowermost can cap in the chute to force it past the holding means onto a can, said can cap engaging means comprising a rotary arm rotating about a horizontal axis and having its outer end movable toward and away from the axis of rotation and provided with a pin adapted to enter the vent hole of a can cap, means for moving the pin outward to engage the vent hole of the lowermost can cap in the chute, and means for moving the pin inward toward the axis of rotation to disengage it from the can cap.

32. The combination with a feed chute for can caps having yielding means for holding the can caps in the chute and provided with arms having a guide passage formed between them, and a cap placing device provided with arms mounted to rotate on a horizontal axis each provided with a pin adapted to be guided by the guide passage into engagement with the vent hole of a can cap.

33. The combination with a feed chute for can caps having yielding means for holding the can caps in the chute and provided with arms having a guide passage formed between them, and a cap placing device provided with arms mounted to rotate on a horizontal axis and having hinged extensions provided with pins adapted to be guided by the guide passage into engagement with the vent hole of a can cap.

34. The combination with a feed chute for can caps having yielding means for holding the can caps in the chute and provided with arms having a guide passage formed between them, a cap placing device provided with arms mounted to rotate on a horizontal axis and having hinged extensions provided with pins adapted to be guided by the guide passage into engagement with the vent hole of a can cap, and a cam guide for guiding the hinged extensions in their rotation.

This specification signed and witnessed this 1st day of January A. D. 1910.

FRANK PITTIS RYDER.

In the presence of—
S. M. RYDER,
M. L. VAN WAGNEN.